United States Patent [19]

Bunnell

[11] Patent Number: 4,919,406

[45] Date of Patent: Apr. 24, 1990

[54] SKI SUPPORT AND ATTACHMENT MEANS

[76] Inventor: Dean E. Bunnell, R.R. #1, Box 63, Canaan, Vt. 05903

[21] Appl. No.: 380,488

[22] Filed: Jul. 17, 1989

[51] Int. Cl.[5] .......... B23Q 3/00

[52] U.S. Cl. .......... 269/43; 269/296; 269/906

[58] Field of Search .......... 269/901, 906, 40, 43, 269/44, 296

[56] References Cited

U.S. PATENT DOCUMENTS

| | | | |
|---|---|---|---|
| 3,826,482 | 7/1974 | Tourangeau | 269/906 |
| 3,963,234 | 6/1976 | Bejtlich | 269/906 |
| 4,050,685 | 9/1977 | Cox | 269/906 |
| 4,081,180 | 3/1978 | Munn | 269/906 |
| 4,522,379 | 6/1985 | Lindgren | 269/906 |

*Primary Examiner*—Robert C. Watson

*Attorney, Agent, or Firm*—Thomas N. Neiman

[57] ABSTRACT

The means comprises a ski bench and attachment piece that has a horizontal support beam that is attached to a plurality of independent folding leg supports. At each end of the horizontal support beam are slotted vertical end supports for the front and rear tips of the skis to fit onto a solid position. An attachment piece is positioned along the horizontal centerline of the horizontal support beam and at its mid-point. This attachment piece has a plurality of immovable vertical extensions that have rigid twin u-shaped supports and a rigid angled brace located at the top of the vertical extensions. A cross country ski binding will snap into position against one of the u-shaped supports or against the angled brace. Separate contoured ski tip supports fit into the slots of the vertical end supports and are used to firm the ski tip area when necessary.

7 Claims, 2 Drawing Sheets

SKI SUPPORT AND ATTACHMENT MEANS

. This invention pertains to ski waxing benches, and in particular to such ski waxing benches which permit the user to lock the skis into position and also function as a ski carrier.

Ski waxing benches are well known in the ski industry in order to allow technicians and individual owners to properly repair and wax the sides and bottoms of the skis. The difficulty for many of these benches is that there are a large number of different type bindings that exist in the business today and the varied number of bindings makes it difficult for any single bench to connect with different bindings without extensive adjustable mechanisms to adjust to all those bindings. Examples of some of these mechanisms can be seen in the U.S. Pat. No. 4,522,379 issued to Erik V. Lindgren on June 11, 1985. This device shows a plurality of adjustable holder which approximates a ski boot and allows the ski binding to be snapped into position over the adjusted holder. The U.S. Pat. No. 3,963,234 dated June 15, 1976 issued to Leonard Bejtlich for a Ski Clamping Apparatus, shows a pivotally mounted latching mechanism positioned at its mid-point. This allows the user to move the ski into position and rotate the latching mechanism into the proper position to connect to the ski binding to facilitate proper waxing and repairing of the sides and bottom of a ski.

The difficulties that are inherent in these designs and should be overcome include the following: adjustment mechanisms can prove to be difficult to operate and tend, in the field, to break down at the wrong time. The more adjustable equipment on a device, the higher probability that there can be mechanical trouble.

Clearly, it is desirable for a ski support and attachment device to be designed to fit all ski bindings with an attachment device that is passive, that is, it is rigidly positioned to fit all type ski bindings. It is the object of this invention, then to set forth an improved ski support and attachment device which avoids the disadvantages limitations, above-recited, which obtain in ski clamping devices. It is another object of this invention to teach a device that locks a ski with its own binding with no clamp or vises.

It is also the object of this invention to teach a ski support and attachment device which is simple to install and use and that will enable the operator to easily attach all type skis with no special adjustments required. Particularly, it is the object of this invention to set forth a ski support and attachment means, for providing a platform for waxing, scraping and otherwise maintaining the sliding surface of skis as well as providing a handy carrier for skis, comprising a horizontal support frame; said horizontal support frame having a plurality of vertical support means; said vertical support means having connection means to said horizontal support frame for permitting rotation of vertical support means; said horizontal support frame having twin vertical ski supports fastened at opposite ends of said horizontal support frame; said ski support having a plurality of recesses located therein; a ski binding attachment base located approximately at the mid-point of said horizontal support frame; said ski binding attachment base comprising a plurality of immovable vertical extensions; said immovable vertical extensions having twin rigid u-shaped connection means attached thereto; said immovable vertical extensions further having a center rigid angled brace; said ski binding attachment base having base anchoring means; said ski binding attachment base having means for replaceable connection to said base anchoring means; and ski tip support means.

Further objects and features of this invention will become more apparent by reference to the following description taken in conjunction with the accompanying figures, in which.

Figure 1:
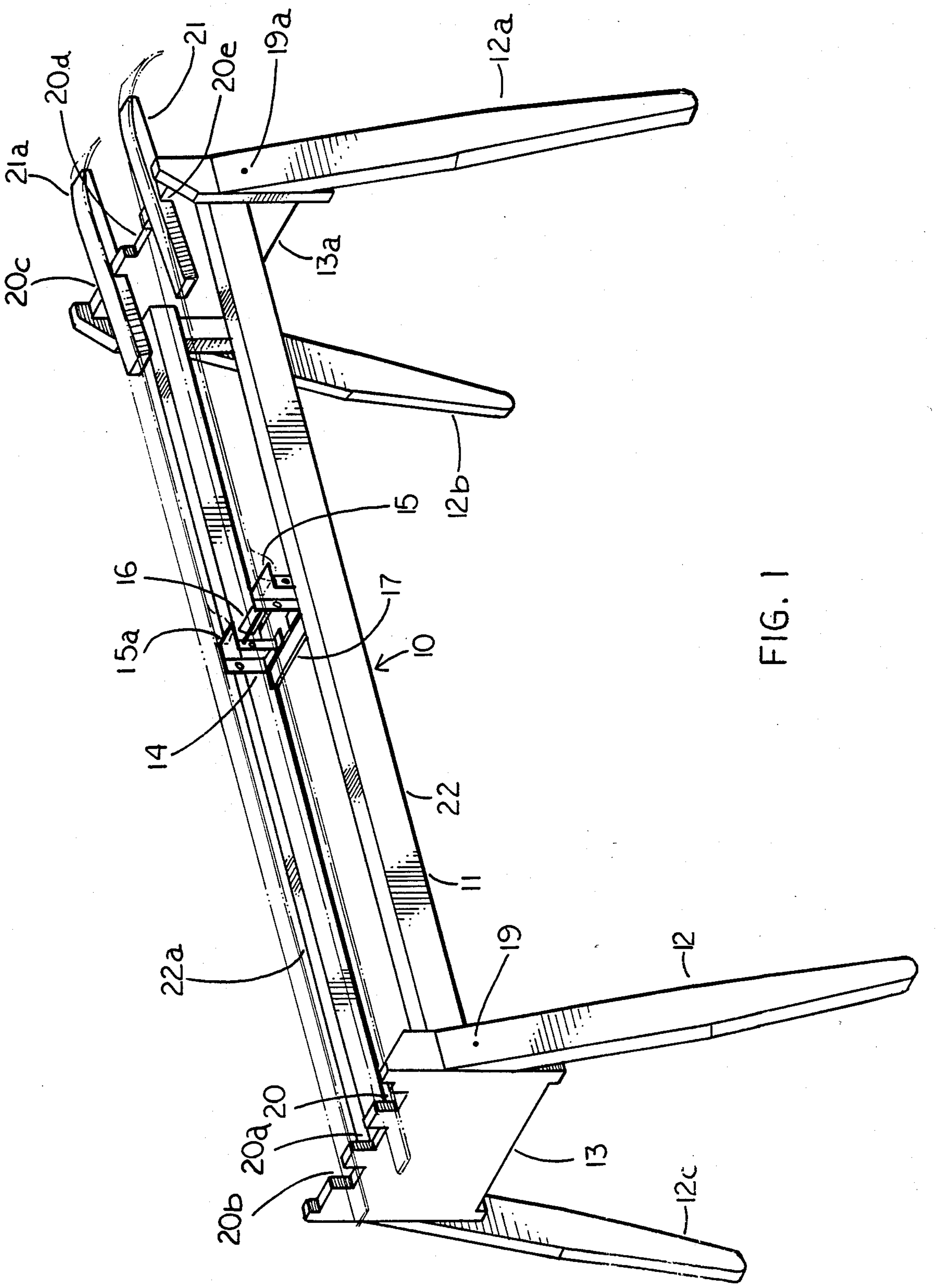
FIG. 1 is a perspective view of the novel ski support and attachment means with the skis in position.
Figure 4:
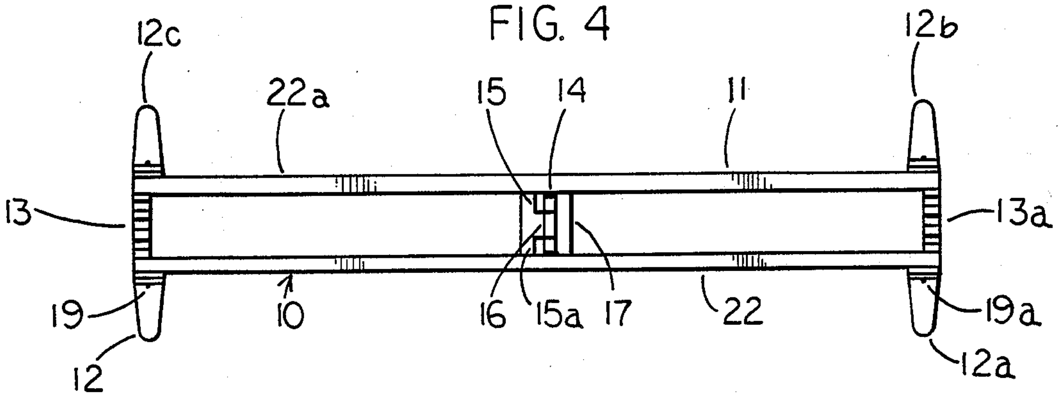
FIG. 4 is a top view thereof.
Figure 2:
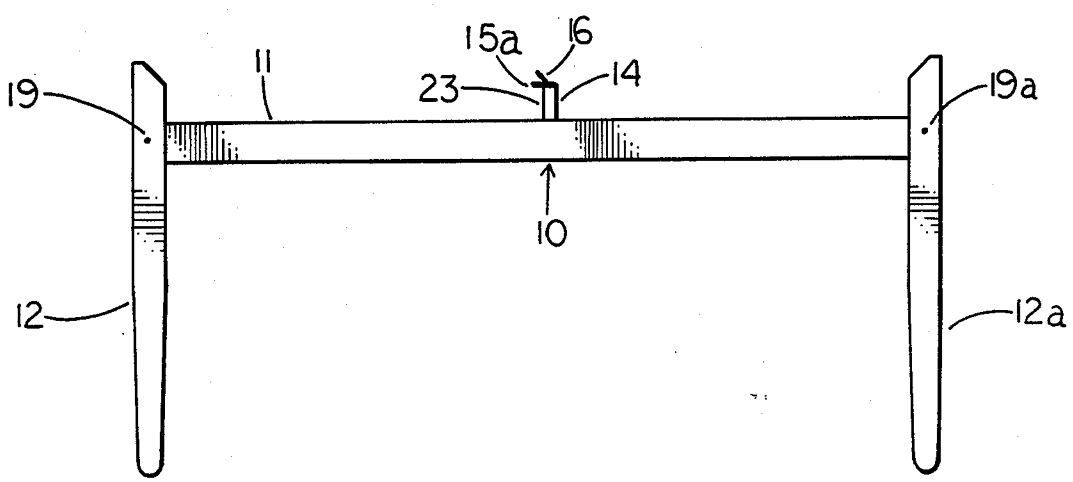
FIG. 2 is a side view thereof.
Figure 3:
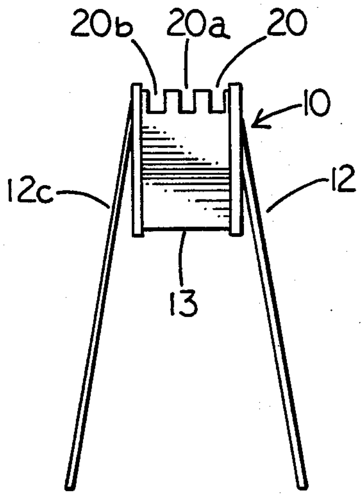
FIG. 3 is a frontal view thereof.
Figure 5:
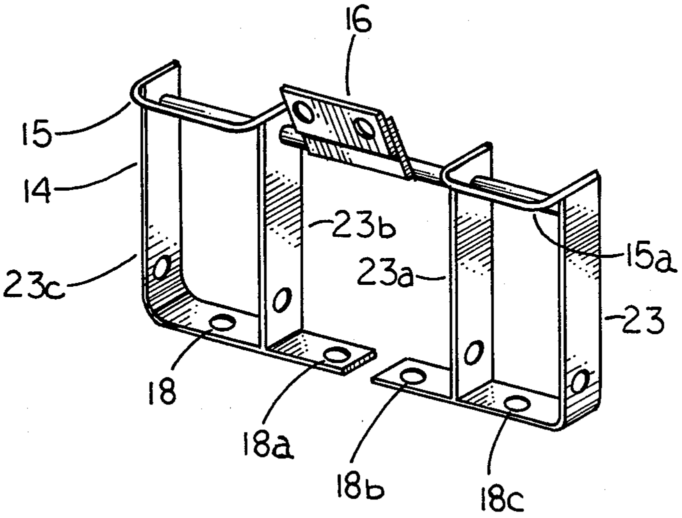
FIG. 5 is an enlarged view of the novel attachment means.

As shown in the figures, the ski support and attachment means 10 is comprised of a horizontal frame 11 which has twin parallel beams 22 and 22*a*. These twin parallel beams 22 and 22*a* are held in relative position by means of ski vertical supports 13 and 13*a* located at either end of the parallel beams 22 and 22*a*. The frame 11 is supported by legs 12, 12*a*, 12*b* and 12*c* that are connected to the parallel beams 22 and 22*a* with bolts 19 and 19*a* that allow the legs to be individually folded. The ski vertical supports 13 and 13*a* have slots 20, 20*a*, 20*b*, 20*c*, 20*d* and 20*e* cut into them. These slots are wide enough to allow the user to fit the ski tip supports 21 and 21*a* into the slots. At the approximate mid-point of the horizontal frame 11 an anchoring block 17 is positioned to act as a support platform for the ski binding attachment piece 14. The attachment piece 14 is comprised of immovable vertical extensions 23, 23*a*, 23*b* and 23*c*. These extensions have twin rigid u-shaped supports 15 and 15*a* and a centrally located rigid angled brace 16. The u-shaped supports 15 and 15*a* and angled brace 16 provide the connection points for the ski bindings. The attachment piece 14 is fastened to the anchoring block 17 by the use of screws or nuts and bolts which pass through apertures 18, 18*a*, 18*b* and 18*c* at the bottom of the attachment piece 14. Separate contoured ski tip supports 21 and 21*a* can be placed under the ski tips or ends of the skis at the ski vertical support 13*a*. These are used when necessary to provide a slight extra elevation and firmness is needed. This occurs when extra pressure is brought down upon the ski at the ski tip or outside the vertical ski support.

In operation, the user takes the skis to be worked upon and turns them upside down. Depending on the particular type of ski binding, the binding is passed through the u-shaped supports and pressed down. This action locks the ski in place with a slight concave arc and the skis are ready to be repaired or waxed. Certain bindings will not attach to the u-shaped supports. Those bindings will fit over the angled center brace. The main difference is that those skis can only be worked upon one ski at a time. The following bindings will fit on the u-shaped supports: (1) the 50 and 75 mm bindings; (2) the Salomon Manual, Automatic, Racing and Skate bindings; (3) the Nordic Norm binding; and (4) the Rotefella automatic bindings. The SDS binding attaches to the angled center brace. All the above-identified bindings lock and unlock to the attachment in the same movement that they attach to the boot. There are no moving parts to the attachment and a single attachment fits all cross country ski bindings.

While I have described my invention in connection with specific embodiments thereof, it is clearly to be understood that this is done only by way of example and not as a limitation to the scope of my invention as set forth in the objects thereof and in the appended claims.

I claim:

1. A ski support and attachment means, for providing a platform for waxing, scraping and otherwise maintaining the sliding surface of skis as well as providing a handy carrier for skis, comprising:
a horizontal support frame;
said horizontal support frame having a plurality of vertical support means;
said vertical support means having connection means to said horizontal support frame for permitting rotation of said vertical support means;
said horizontal support frame having twin vertical ski supports fastened at opposite ends of said horizontal support frame;
said ski supports having a plurality of recesses located therein;
a ski binding attachment base located at the midpoint of said horizontal support frame;
said ski binding attachment base comprising a plurality of immovable vertical extensions;
said immovable vertical extensions having twin rigid u-shaped connection means attached thereto;
said vertical extensions further having a center rigid angled extension brace;
said ski binding attachment base having base anchoring means;

said ski binding attachment base further having means for replaceable connection to said base anchoring means; and
ski tip support means.

2. A ski support and attachment means, according to claim 1, wherein:
said horizontal support frame comprises a pair of parallel support beams.

3. A ski support and attachment means, according to claim 1, wherein:
said vertical support means comprise angled legs.

4. A ski support and attachment means, according to claim 1, wherein:
vertical support connection means comprise bolt .connectors for allowing each of said vertical support to fold independently.

5. A ski support and attachment means, according to claim 1, wherein:
said recesses comprise a plurality of slots having sufficient width for accepting of said ski tip support means within said slots.

6. A ski support and attachment means, according to claim 1, wherein:
said base anchoring means comprises a crosspiece affixed within said horizontal support frame.

7. A ski support and attachment means, according to claim 1, wherein:
said ski tip support means comprise a contoured block raising the tips of said skis by being positioned under said ski tips at said ski vertical supports.

* * * * *